(12) United States Patent
Bian et al.

(10) Patent No.: US 11,378,743 B1
(45) Date of Patent: Jul. 5, 2022

(54) OPTICAL COMPONENTS IN THE BACK-END-OF-LINE STACK OF A PHOTONICS CHIP USING PLURAL CORES VERTICALLY STACKED

(71) Applicant: GLOBALFOUNDRIES U.S. Inc., Santa Clara, CA (US)

(72) Inventors: Yusheng Bian, Ballston Lake, NY (US); Roderick A. Augur, Saratoga Springs, NY (US); Kenneth J. Giewont, Hopewell Junction, NY (US); Karen Nummy, Newburgh, NY (US); Edward Kiewra, South Burlington, VT (US); Steven M. Shank, Jericho, VT (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/146,864

(22) Filed: Jan. 12, 2021

(51) Int. Cl.
*G02B 6/122* (2006.01)
*G02B 6/34* (2006.01)
(Continued)

(52) U.S. Cl.
CPC .......... *G02B 6/1225* (2013.01); *G02B 6/136* (2013.01); *G02B 6/34* (2013.01); *G02B 2006/1213* (2013.01)

(58) Field of Classification Search
CPC ........ G02B 6/1225; G02B 6/136; G02B 6/34; G02B 2006/1213
See application file for complete search history.

(56) References Cited

U.S. PATENT DOCUMENTS

| 5,033,812 A | * | 7/1991 | Yoshida | G02B 6/124 385/37 |
| 6,819,845 B2 | * | 11/2004 | Lee | H01L 29/127 385/5 |

(Continued)

OTHER PUBLICATIONS

M. Rakowski, C. Meagher, K. Nummy, A. Aboketaf, J. Ayala, Y. Bian, B. Harris, K. Mclean, K. McStay, A. Sahin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

(Continued)

*Primary Examiner* — Andrew Jordan
(74) *Attorney, Agent, or Firm* — Thompson Hine LLP; Anthony Canale

(57) ABSTRACT

Structures including a grating coupler and methods of fabricating a structure including a grating coupler. The structure includes structure includes a dielectric layer on a substrate, a first waveguide core positioned in a first level over the dielectric layer, and a second waveguide core positioned in a second level over the dielectric layer. The second level differs in elevation above the dielectric layer from the first level. The first waveguide core includes a tapered section. The structure further includes a grating coupler having a plurality of segments positioned in the second level adjacent to the second waveguide core. The segments of the grating coupler and the tapered section of the first waveguide core are positioned in an overlapping arrangement.

20 Claims, 10 Drawing Sheets

(51) Int. Cl.
*G02B 6/136* (2006.01)
*G02B 6/12* (2006.01)

(56) References Cited

U.S. PATENT DOCUMENTS

| | | | | |
|---|---|---|---|---|
| 6,927,895 | B2* | 8/2005 | Ju | G02F 1/3775 359/332 |
| 6,944,192 | B2* | 9/2005 | Prassas | H01S 3/06716 372/64 |
| 6,961,499 | B2* | 11/2005 | Lee | B82Y 10/00 385/5 |
| 7,005,669 | B1* | 2/2006 | Lee | B82Y 20/00 257/17 |
| 7,020,372 | B2* | 3/2006 | Lee | G02F 1/3556 257/E29.082 |
| 7,541,573 | B2* | 6/2009 | Emmerson | G01N 21/4133 385/12 |
| 7,680,371 | B2* | 3/2010 | Cheben | G02B 6/14 385/124 |
| 8,213,478 | B2* | 7/2012 | Park | H01S 5/0261 372/50.11 |
| 9,574,950 | B2* | 2/2017 | Andrejco | G01K 11/3206 |
| 10,746,907 | B2 | 8/2020 | Jacob et al. | |
| 10,816,696 | B2* | 10/2020 | Jin | G02F 1/0147 |
| 10,816,726 | B1* | 10/2020 | Peng | G02B 6/3636 |
| 2003/0231375 | A1* | 12/2003 | Ju | G02F 1/3775 359/332 |
| 2004/0126072 | A1* | 7/2004 | Hoon Lee | G02B 6/1225 385/27 |
| 2004/0156589 | A1* | 8/2004 | Gunn | G02B 6/12004 385/37 |
| 2005/0058415 | A1* | 3/2005 | Lee | B82Y 20/00 257/E29.082 |
| 2005/0058416 | A1* | 3/2005 | Hoon Lee | G02F 1/3515 257/E29.082 |
| 2008/0043242 | A1* | 2/2008 | Emmerson | G01N 21/4133 356/450 |
| 2008/0193079 | A1* | 8/2008 | Cheben | G02B 6/14 385/28 |
| 2008/0193080 | A1* | 8/2008 | Cheben | G02B 6/14 385/124 |
| 2011/0150018 | A1* | 6/2011 | Park | H01S 5/1003 372/45.01 |
| 2015/0338286 | A1* | 11/2015 | Andrejco | G01L 1/246 356/73.1 |
| 2018/0011249 | A1* | 1/2018 | Zhu | G02B 6/124 |
| 2020/0081155 | A1* | 3/2020 | Jin | G02B 6/136 |

OTHER PUBLICATIONS

Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

J. Yao et al., "Grating-coupler based low-loss optical interlayer coupling," 8th IEEE International Conference on Group IV Photonics, London, 2011, pp. 383-385, doi: 10.1109/GROUP4.2011.6053824.

Majid Sodagar, Reza Pourabolghasem, Ali A. Eftekhar, and Ali Adibi, "High-efficiency and wideband interlayer grating couplers in multilayer Si/SiO2/SiN platform for 3D integration of optical functionalities," Opt. Express 22, 16767-16777 (2014).

* cited by examiner

OPTICAL COMPONENTS IN THE BACK-END-OF-LINE STACK OF A PHOTONICS CHIP USING PLURAL CORES VERTICALLY STACKED

BACKGROUND

The present invention relates to photonics chips and, more specifically, to structures including a grating coupler and methods of fabricating a structure including a grating coupler.

Photonics chips are used in numerous applications, such as data communication systems and data computation systems. A photonics chip monolithically integrates optical components, such as waveguides, optical switches, couplers, and modulators, and electronic components, such as field-effect transistors, into a unified platform. Among other factors, layout area, cost, and operational overhead may be reduced by the chip-level integration of both types of components on the same chip.

A photonics chip includes a multilayer stack formed by back-end-of-line processing over the optical components. The multilayer stack include interlayer dielectric layers arranged in different levels and metal lines placed in the interlayer dielectric layers in the different levels. The interlayer dielectric layers provide electrical isolation, and the metal lines are vertically interconnected by vias. Conventional photonics chips do not place optical components, such as grating couplers or waveguides, in the multilevel stack. Instead, optical components are formed during middle-of-line and front-end-of-line processing, which are followed by back-end-of-line processing to form the multilayer stack.

Improved structures including a grating coupler and methods of fabricating a structure including a grating coupler are needed.

SUMMARY

In an embodiment of the invention, a structure includes a substrate, a dielectric layer on the substrate, a first waveguide core positioned in a first level over the dielectric layer, and a second waveguide core positioned in a second level over the dielectric layer. The second level differs in elevation above the dielectric layer from the first level. The first waveguide core includes a tapered section. The structure further includes a grating coupler having a plurality of segments positioned in the second level adjacent to the second waveguide core. The segments of the grating coupler and the tapered section of the first waveguide core are positioned in an overlapping arrangement.

In an embodiment of the invention, a structure includes a substrate, a dielectric layer on the substrate, a first waveguide core positioned in a first level over the dielectric layer, a first grating coupler positioned in the first level adjacent to the first waveguide core, a second waveguide core positioned in a second level over the dielectric layer, and a second grating coupler including a plurality of segments positioned in the second level adjacent to the second waveguide core. The segments of the second grating coupler and the segments of the first grating coupler are positioned in an overlapping arrangement.

In an embodiment of the invention, a method includes forming a first waveguide core positioned within a first level over a dielectric layer on a substrate, and forming a second waveguide core and a grating coupler adjacent to the second waveguide core. The first waveguide core includes a tapered section. The second waveguide core and the grating coupler are positioned in a second level over the dielectric layer. The second level differs in elevation above the dielectric layer from the first level. The grating coupler includes a plurality of segments positioned in an overlapping arrangement with the tapered section of the first waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
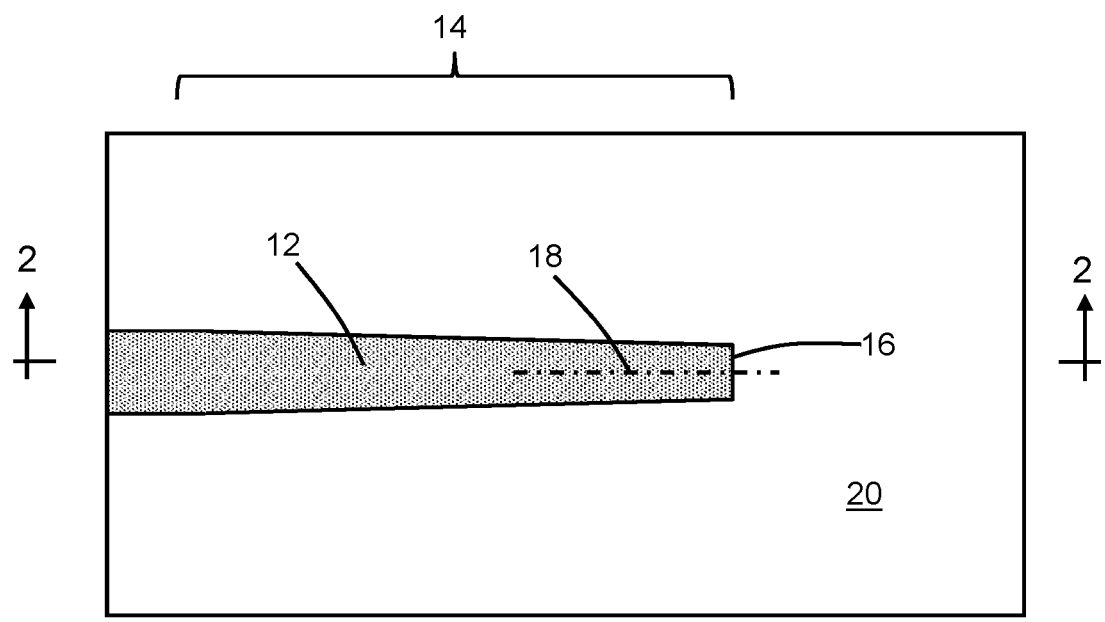
FIG. 1 is a top view of a structure at an initial fabrication stage of a processing method in accordance with embodiments of the invention.
Figure 2:
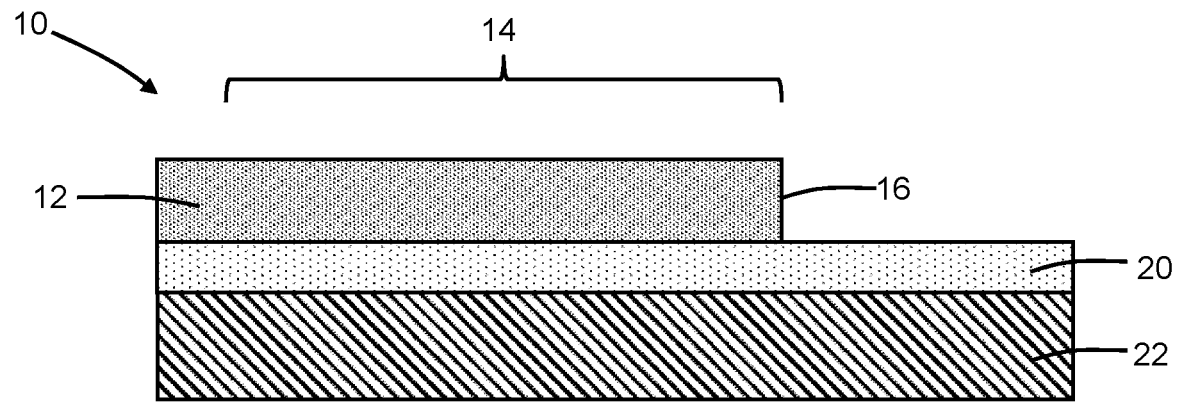
FIG. 2 is a cross-sectional view of the structure taken generally along line 2-2 in FIG. 1.

With reference to FIGS. 1, 2 and in accordance with embodiments of the invention, a structure 10 for a multilayer coupler includes a waveguide core 12 having a tapered section 14 of a given length that terminates at an end surface 16. The tapered section 14 of the waveguide core 12 may extend lengthwise along a longitudinal axis 18. The tapered section 14 gradually becomes narrower in a direction along the longitudinal axis 18 with decreasing distance from the end surface 16. The tapered section 14 of the waveguide core 12 has a width dimension that varies with position along the longitudinal axis 18 and that has a minimum width occurring at the end surface 16. In an embodiment, the width dimension of the tapered section 14 may be narrowest at the end surface 16 and vary over its length based on a linear function to provide a trapezoidal shape. In an alternative embodiment, the width dimension of the tapered section 14 may be narrowest at the end surface 16 and vary over its length based on a non-linear function, such as a quadratic, parabolic, or exponential function.

The waveguide core 12 may be comprised of a single-crystal semiconductor material, such as single-crystal silicon. In an embodiment, the single-crystal semiconductor material may originate from a device layer of a silicon-on-insulator (SOI) substrate that further includes a dielectric layer 20 provided by a buried oxide layer and a substrate 22 comprised of a single-crystal semiconductor material, such as single-crystal silicon. The waveguide core 12 may be patterned from the device layer by lithography and etching processes during front-end-of-line processing. The waveguide core 12 and its tapered section 14 are positioned in a given layer or level over the dielectric layer 20 and the substrate 22.

Figure 3:
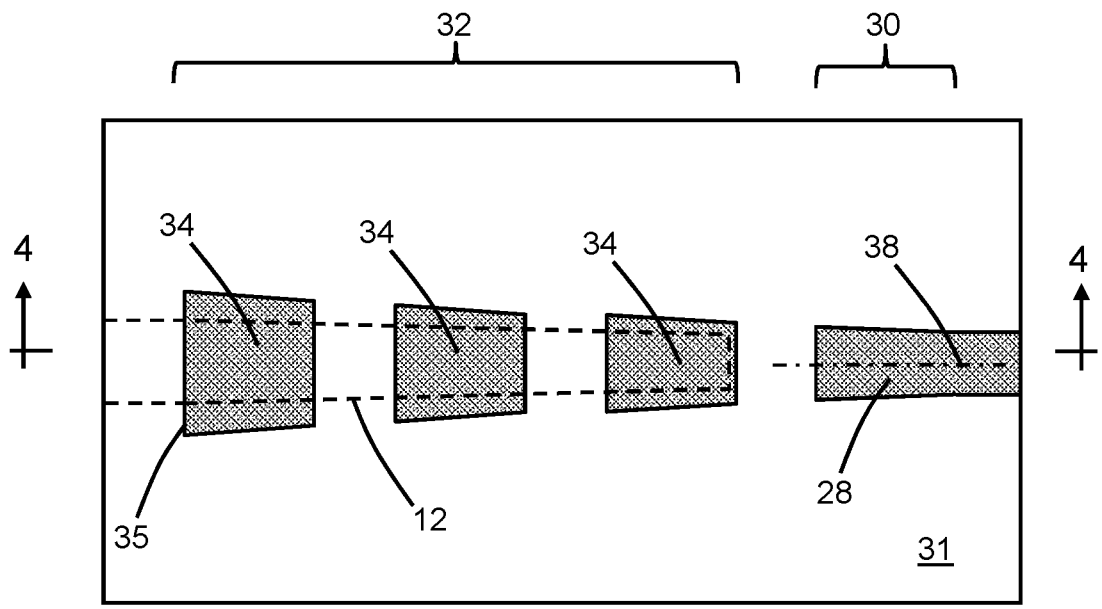
FIG. 3 is a top view of the structure at a fabrication stage subsequent to FIG. 1.
Figure 4:
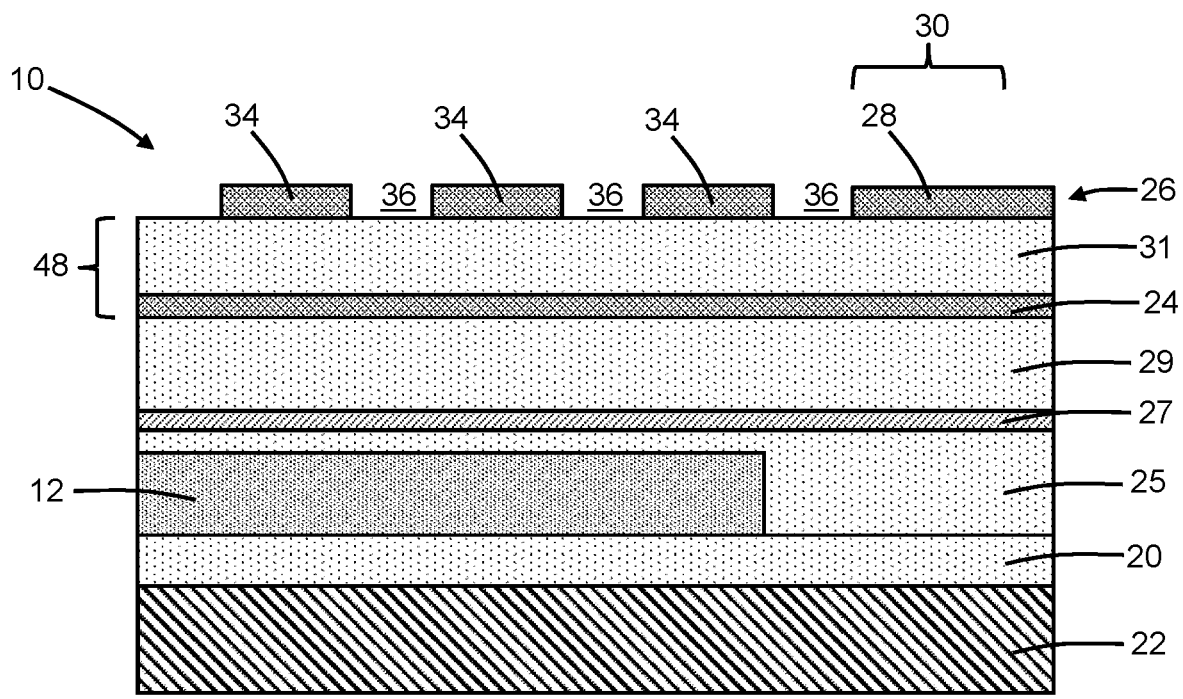
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 24, a patterned dielectric layer 26, and dielectric layers 25, 27, 29, 31 are formed over the waveguide core 12 and dielectric layer 20. The dielectric layers 25, 29, 31 may be comprised of silicon dioxide, and the dielectric layer 27 may be comprised of silicon nitride. The silicon dioxide comprising the dielectric layers 25, 29, 31 may be formed by plasma-enhanced chemical vapor deposition using ozone and tetraethylorthosilicate (TEOS) as reactants. Alternatively, the silicon dioxide comprising one or more of the dielectric layers 25, 29, 31 may be fluorinated by adding fluorine as an additional reactant during plasma-enhanced chemical vapor deposition. Alternatively, the silicon dioxide comprising the dielectric layers 25, 29, 31 may comprise stacked sublayers containing tetraethylorthosilicate silicon dioxide and fluorinated-tetraethylorthosilicate silicon dioxide.

The dielectric layer 24 and the dielectric layers 25, 27, 29, 31 may be solid and non-patterned (i.e., unbroken) above the waveguide core 12. The dielectric layer 24, the dielectric layers 25, 27, 29, 31, and the patterned dielectric layer 26 may have a refractive index that is less than the refractive index of the waveguide core 12. The dielectric layer 24 and patterned dielectric layer 26 may have a refractive index that is greater than the refractive index of dielectric layers 25, 29, 31. The dielectric layer 27 may also have a refractive index that is greater than the refractive index of dielectric layers 25, 29, 31. The dielectric layer 27 is positioned in a vertical direction between the dielectric layers 25, 29, the dielectric layer 24 is positioned in a vertical direction between the dielectric layers 29, 31, and the dielectric layer 31 is positioned in a vertical direction between the dielectric layer 24 and the patterned dielectric layer 26. The dielectric layer 24 is positioned in a vertical direction between the waveguide core 12 and the patterned dielectric layer 26.

The dielectric layer 24 and the patterned dielectric layer 26 are comprised of a material having a different composition than the materials of the dielectric layers 25, 27, 29, 31. In an embodiment, the dielectric layer 24 and the patterned dielectric layer 26 may be comprised of silicon-carbon nitride (e.g., nitrogen-doped silicon carbide (SiCN)) deposited by chemical vapor deposition or plasma-enhanced chemical vapor deposition using reactants that supply silicon, carbon, and nitrogen. In an embodiment, the dielectric layer 24 and the patterned dielectric layer 26 may be comprised of hydrogenated silicon-carbon nitride (e.g., nitrogen-doped hydrogenated silicon carbide (SiCNH)) deposited by chemical vapor deposition or plasma-enhanced chemical vapor deposition using reactants that supply silicon, carbon, nitrogen, and hydrogen.

The dielectric layers 25, 27, 29, which may be formed by middle-of-line processing, may include contacts that are coupled to electronic components, such as field-effect transistors, and active optical components, such as a Mach-Zehnder modulator. The dielectric layer 24, the patterned dielectric layer 26, and the intervening dielectric layer 31 may be formed by back-end-of-line processing as levels in a back-end-of-line stack 48.

The patterned dielectric layer 26 includes a waveguide core 28 having a tapered section 30 and a grating coupler 32 with tapered segments 34 that provide the grating structures of the grating coupler 32. The tapered section 30 of the waveguide core 28 is positioned adjacent to the tapered segments 34 of the grating coupler 32, and the tapered section 30 and tapered segments 34 are arranged lengthwise along a longitudinal axis 38.

Each tapered segment 34 may gradually become narrower in a direction along the longitudinal axis 38 with increasing distance from an end surface 35 of the segment 34 furthest from the tapered section 30 of the waveguide core 28. In the representative embodiment, each tapered segment 34 is a ridge or strip that has a width dimension that decreases with decreasing distance from the tapered section 30 of the waveguide core 28. In an embodiment, the width dimension of the tapered segments 34 may be narrowest at the end surface 35 and vary over the length of the grating coupler based on a linear function. In the representative embodiment, the width dimensions of the tapered segments 34 are selected such that the grating coupler 32 is inversely tapered. In an embodiment, the tapered segments 34 and the tapered section 30 each define an inverse taper that is tapered in the opposite direction with respect to the tapering of the tapered section 14 of the waveguide core 12. As used herein, an inverse taper is a tapered section of waveguide core with a gradual increase in width along the propagation direction of the light guided by the inverse taper. In an embodiment, the width dimension of the tapered segments 34 may vary based on a linear function to provide a trapezoidal shape. In an alternative embodiment, the width dimension of the tapered segments 34 may vary based on a non-linear function, such as a quadratic, parabolic, or exponential function.

The patterned dielectric layer 26 may be formed by lithography and etching processes. The patterned dielectric layer 26 may be fully etched or, alternatively, only partially etched to define a thin slab layer coupled to a lower portion of the tapered segments 34 and at least the tapered section 30 of the waveguide core 28. The tapered segments 34 have an alternating arrangement with grooves 36 that separate adjacent pairs of the tapered segments 34 and that separate the tapered segment 34 at one end of the grating coupler 32 from the tapered section 30 of the waveguide core 28. If the patterned dielectric layer 26 is fully etched, the grooves 36 may extend to the dielectric layer 31 such that strips of the dielectric layer 31 are revealed between the tapered segments 34. In an embodiment, the pitch and duty cycle of the tapered segments 34 may be uniform to define a periodic arrangement. In alternative embodiments, the pitch and/or the duty cycle of the tapered segments 34 may be apodized (i.e., non-uniform) to define a non-periodic arrangement. The duty cycle and pitch of the tapered segments 34, as well as the dimensions of the tapered segments 34, may be selected to optimize phase matching with the tapered section 14 of the waveguide core 12.

The waveguide core 28 and the grating coupler 32 are positioned in a given layer or level in the back-end-of-line stack 48 over the dielectric layer 20 on the substrate 22. The level of the waveguide core 28 and the grating coupler 32 differs in elevation above the dielectric layer 20 from the level of the waveguide core 12 and its tapered section 14. The dielectric layer 24 is also positioned in a given layer or level in the back-end-of-line stack 48 over the dielectric layer 20 on the substrate 22, and the level of the dielectric layer 24 differs in elevation above the dielectric layer 20 from the level of the waveguide core 28 and grating coupler 32 and differs in elevation above the dielectric layer 20 from the level of the waveguide core 12 and its tapered section 14.

The tapered segments 34 of the grating coupler 32 are positioned over the tapered section 14 of the waveguide core 12 and have an overlapping relationship with the tapered section 14 of the waveguide core 12. In an embodiment, the tapered segments 34 of the grating coupler 32 may be centered over the tapered section 14 of the waveguide core 12. In an embodiment, the tapered segments 34 of the grating coupler 32 may be wider than the tapered section 14 of the waveguide core 12 at any position along the longitudinal axes 18, 38. In an embodiment, the longitudinal axis 18 may be aligned parallel to the longitudinal axis 38. The overlapped positioning may promote the efficient interlayer transmission of optical signals from the waveguide core 12 upward to the waveguide core 28.

In the representative embodiment, the dielectric layer 24 is positioned between the grating coupler 32 and the waveguide core 12 such that a single solid and non-patterned layer comprised of the same material as the waveguide core 28 and the grating coupler 32 is positioned in a vertical direction between the tapered section 14 of the waveguide core 12 and the grating coupler 32. In an alternative embodiment, the dielectric layer 24 may be patterned to form the waveguide core 28 and the grating coupler 32, and the dielectric layer 26 may be solid and non-patterned such that a solid and non-patterned layer comprised of the same material as the waveguide core 28 and the grating coupler 32 is not positioned in a vertical direction between the tapered section 14 of the waveguide core 12 and the grating coupler 32.

Figure 5:
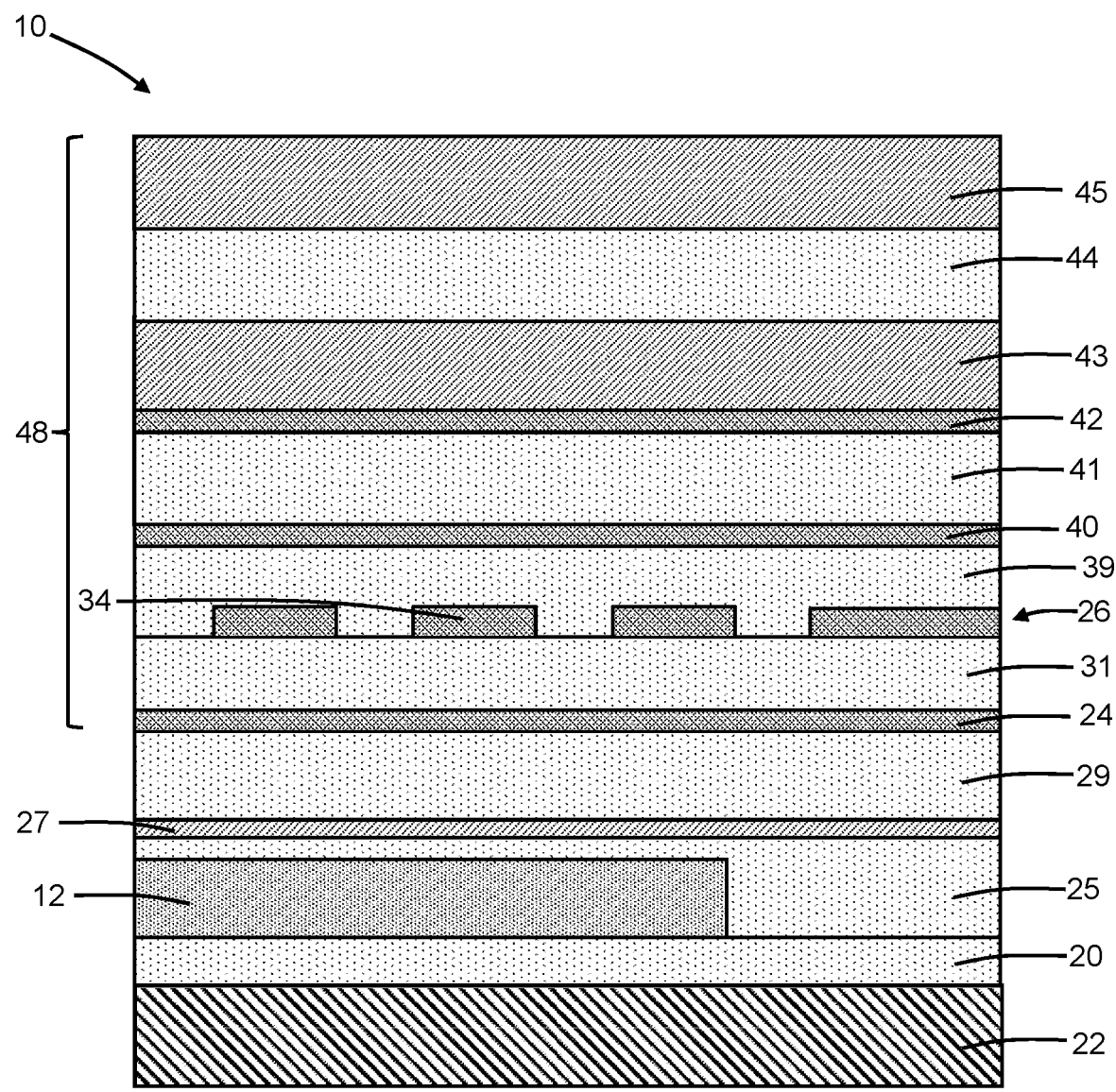
FIG. 5 is a cross-sectional view of the structure at a fabrication stage subsequent to FIG. 4.

With reference to FIG. 5 in which like reference numerals refer to like features in FIG. 4 and at a subsequent fabrication stage, additional dielectric layers 39, 40, 41, 42, 43, 44, 45 of the back-end-of-line stack 48 are formed by back-end-of-line processing over the patterned dielectric layer 26 and the dielectric layer 31. The dielectric layers 39, 41, 44 may be comprised of silicon dioxide (e.g., tetraethylorthosilicate silicon dioxide and/or fluorinated-tetraethylorthosilicate silicon dioxide), the dielectric layers 43, 45 may be comprised of silicon nitride, and the dielectric layers 40, 42 may be comprised of either silicon-carbon nitride or hydrogenated silicon-carbon nitride. Portions of the dielectric layer 39 may fill the grooves 36 between the tapered segments 34 of the grating coupler 32.

The dielectric layer 40 is arranged in a vertical direction between the dielectric layers 39, 41, the dielectric layer 42 is arranged in a vertical direction between the dielectric layers 41, 43, and the dielectric layer 44 is arranged in a vertical direction between the dielectric layers 43, 45. The dielectric layer 43 may directly contact the dielectric layer 42. The dielectric layers 40, 42 are positioned in given layers or levels over the dielectric layer 20 on the substrate 22, and the levels of the dielectric layers 40, 42 differ in elevation above the dielectric layer 20 from the level of the grating coupler 32 and also differ in elevation above the dielectric layer 20 from the level of the waveguide core 12 and its tapered section 14.

In an alternative embodiment, the dielectric layer 40 may be patterned to form the waveguide core 28 and the grating coupler 32, and the dielectric layers 24, 26 may be solid and non-patterned. In this embodiments, multiple dielectric layers 24, 26 that are solid and non-patterned, and that are comprised of the same material as the waveguide core 28 and the grating coupler 32, may be positioned in a vertical direction between the tapered section 14 of the waveguide core 12 and the grating coupler 32.

In use, optical signals are guided by the waveguide core 12 to the structure 10. The arriving optical signals are transmitted upwardly from the tapered section 14 of the waveguide core 12 to the grating coupler 32 located in the back-end-of-line stack 48. The waveguide core 28, which is also located in the back-end-of-line stack 48, guides the optical signals away from the grating coupler 32.

The structure 10 includes layers of different materials arranged in different levels of a multiple-level coupler. The structure 10, in any of its embodiments described herein, may be integrated into a photonics chip that may include electronic components and additional optical components in addition to the structure 10. The electronic components may include, for example, field-effect transistors that are fabricated by CMOS processing using the device layer of the silicon-on-insulator substrate. The back-end-of-line stack 48 may include metal lines that are stacked into the different levels and that are vertically interconnected through vias with the electronic components and active optical components. The metal lines of the back-end-of-line stack 48 may be absent in the vicinity of the structure 10 so as to not interfere with the multilevel transfer of optical signals by the structure 10.

Figure 6:
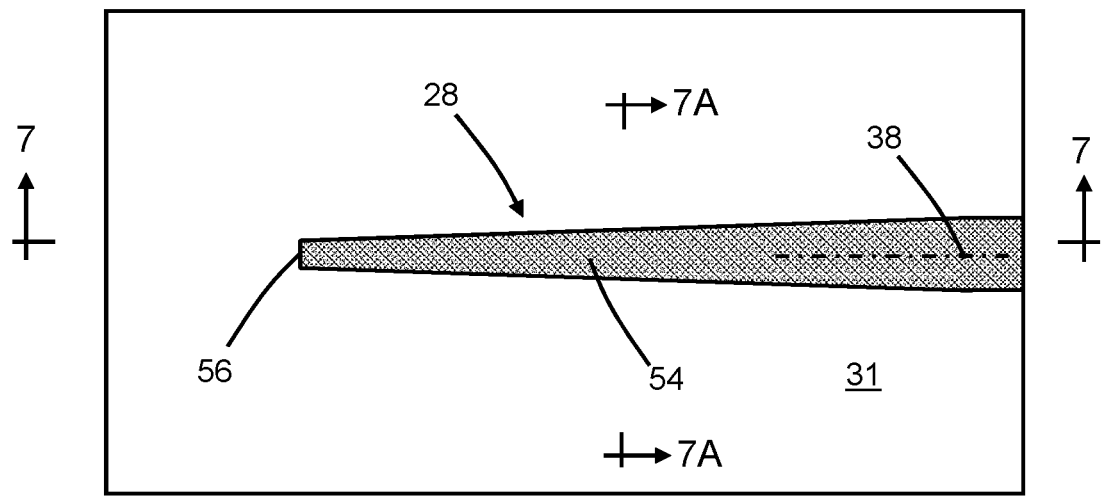
FIG. 6 is a top view of a structure in accordance with alternative embodiments of the invention.
Figure 7:
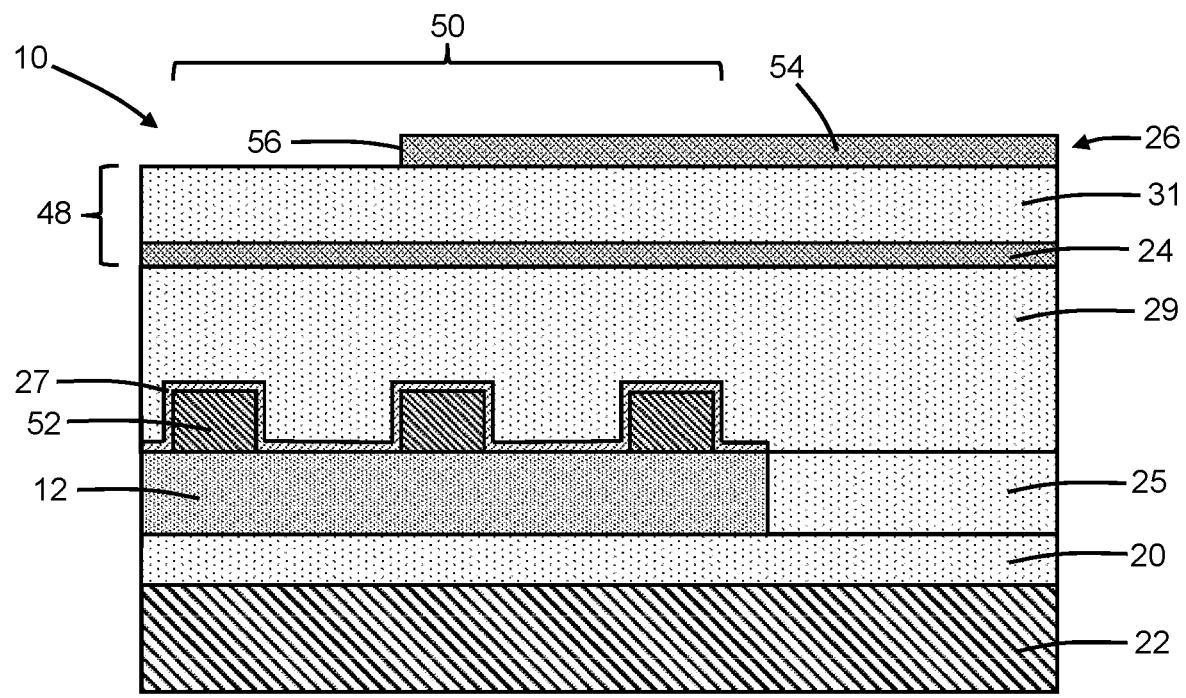
FIG. 7 is a cross-sectional view of the structure taken generally along line 7-7 in FIG. 6.
Figure 7A:
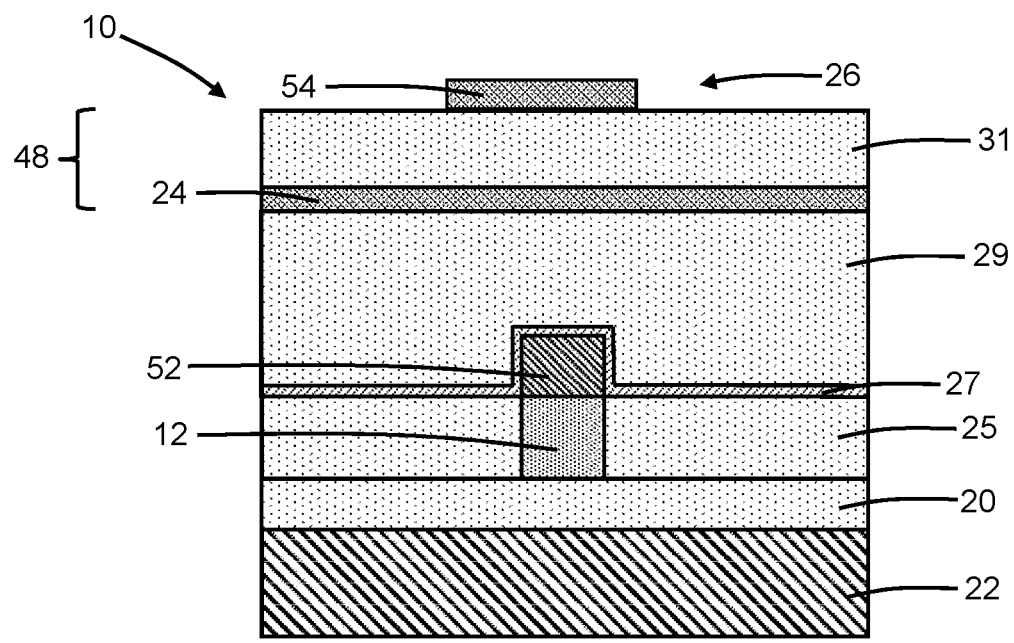
FIG. 7A is a cross-sectional view of the structure taken generally along line 7A-7A in FIG. 6.

With reference to FIGS. 6, 7, 7A and in accordance with alternative embodiments of the invention, the structure 10 may be modified to introduce a grating coupler 50 that is optically coupled to the waveguide core 12, to provide the waveguide core 28 with a tapered section 54 that is not segmented, and to eliminate the grating coupler 32 from the patterned dielectric layer 26. The grating coupler 50 includes segments 52 that supply grating structures. The segments 52 have an alternating arrangement with grooves that separate adjacent pairs of segments 52. In an embodiment, the pitch and duty cycle of the segments 52 may be uniform to define a periodic arrangement. In alternative embodiments, the pitch and/or the duty cycle of the segments 52 may be apodized (i.e., non-uniform) to define a non-periodic arrangement.

The segments 52 of the grating coupler 50 may be comprised of, for example, polycrystalline silicon (i.e., polysilicon). The segments 52 of the grating coupler 50 may be formed, for example, by depositing a layer of polysilicon and patterning the deposited polysilicon layer with lithography and etching processes. The dielectric layer 27 may conformally extend across the segments 52 and portions of the waveguide core 12 not covered by the segments 52. The waveguide core 12 may be a straight waveguide core that is non-tapered. The segments 52 may be surrounded by a layer (not shown) comprised of a material (e.g., silicon dioxide) having a different composition than the material of the dielectric layer 27.

The waveguide core 28 and its tapered section 54 are positioned in a given layer or level over the dielectric layer 20 on the substrate 22. The level of the tapered section 54 differs in elevation above the dielectric layer 20 from the level of the grating coupler 50. The tapered section 54 of the waveguide core 28 is positioned over the segments 52 of the grating coupler 50 and overlaps with the segments 52 of the grating coupler 50. In particular, the tapered section 54 is terminated by an end surface 56 that is located over the segments 52 of the grating coupler 50. In an embodiment, the tapered section 54 of the waveguide core 28 may be centered over the segments 52 of the grating coupler 50. The overlapped positioning of the tapered section 54 over the grating coupler 50 may promote the efficient transfer of optical signals from the waveguide core 12 upward to the waveguide core 28. In an embodiment, the segments 52 and the waveguide core 12 may have substantially equal width dimensions, and the width dimension of the tapered section 54 may be greater than the width dimension of the segments 52 where overlapped.

Processing of the structure 10 continues as described in connection with FIG. 5.

Figure 8:
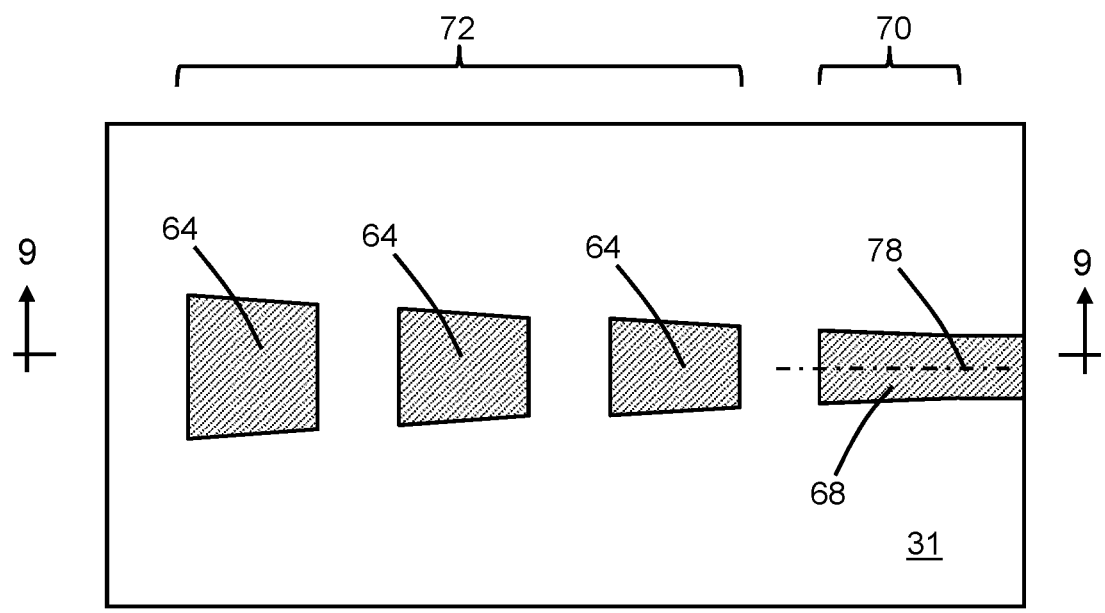
FIG. 8 is a cross-sectional view of a structure in accordance with alternative embodiments of the invention.
Figure 9:
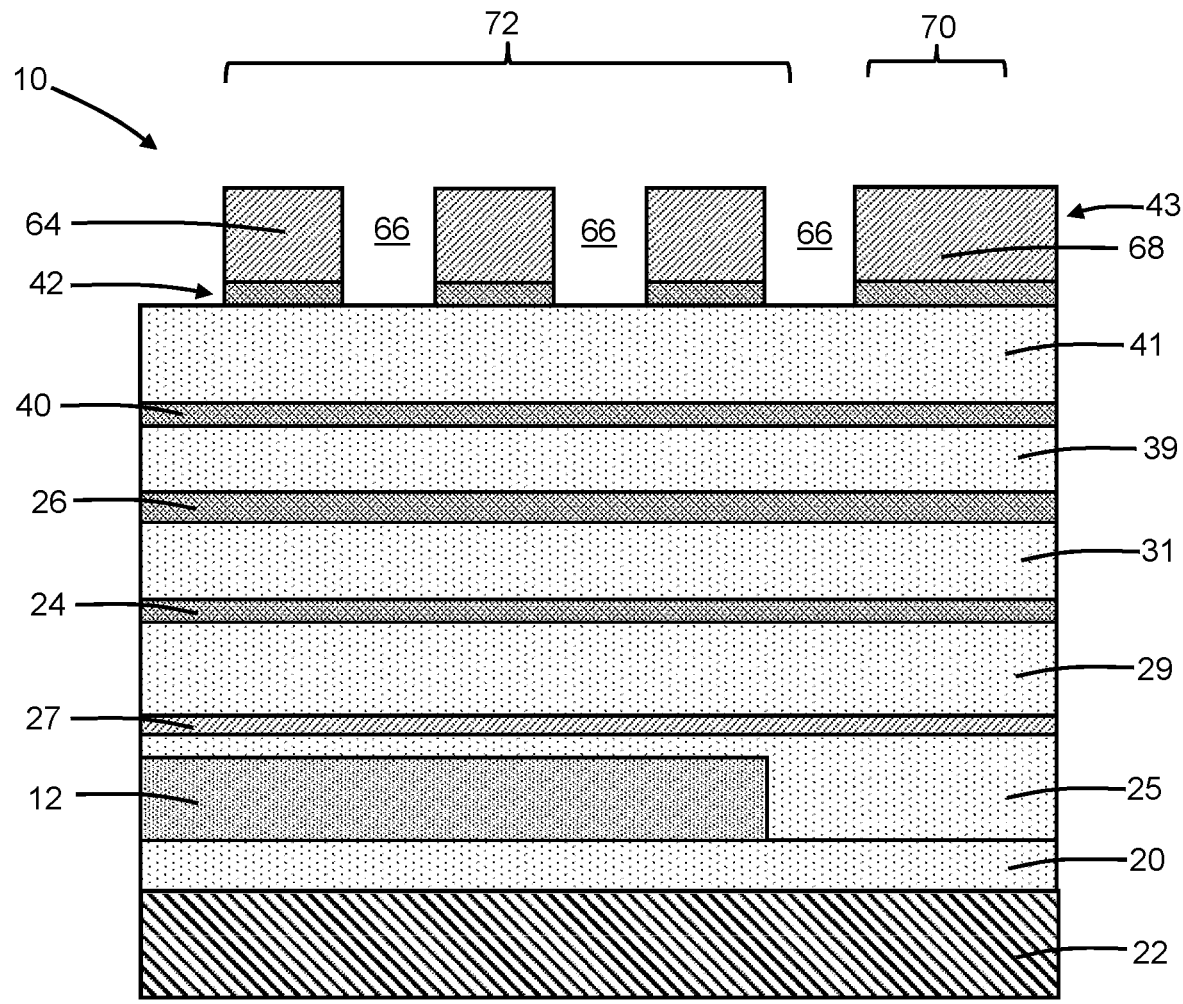
FIG. 9 is a cross-sectional view of the structure taken generally along line 9-9 in FIG. 8.

With reference to FIGS. 8, 9 and in accordance with alternative embodiments of the invention, the dielectric layers 42, 43 may be patterned to form a waveguide core 68 similar to the waveguide core 28 and a grating coupler 72 similar to the grating coupler 32, and the dielectric layers 24, 26, 40 may be solid and non-patterned. The dielectric layers 24, 26, 40, which are solid and non-patterned, are comprised of the same dielectric material as lower portions of the waveguide core 68 and the grating coupler 72, and the dielectric layers 24, 26, 40 are positioned in a vertical direction between the tapered section 14 of the waveguide core 12 and the grating coupler 72. The grating coupler 72 includes tapered segments 64 similar to tapered segments 34, grooves 66 similar to grooves 36 between adjacent tapered segments 64, and a tapered section 70 similar to tapered section 30. The tapered segments 64 of the grating coupler 72 are comprised of multiple dielectric materials, in this instance the material of the dielectric layer 42 as a lower portion and the material of the dielectric layer 43 as an upper portion. The tapered segments 64 and the tapered section 70 are positioned along a longitudinal axis 78. In an embodiment, the tapered segments 64 of the grating coupler 72 may be centered over the tapered segments 34 of the grating coupler 32 and the tapered section 14 of the waveguide core 12.

Processing of the structure 10 continues as described in connection with FIG. 5 to form the dielectric layers 44, 45 over the waveguide core 68 and grating coupler 72.

Figure 10:
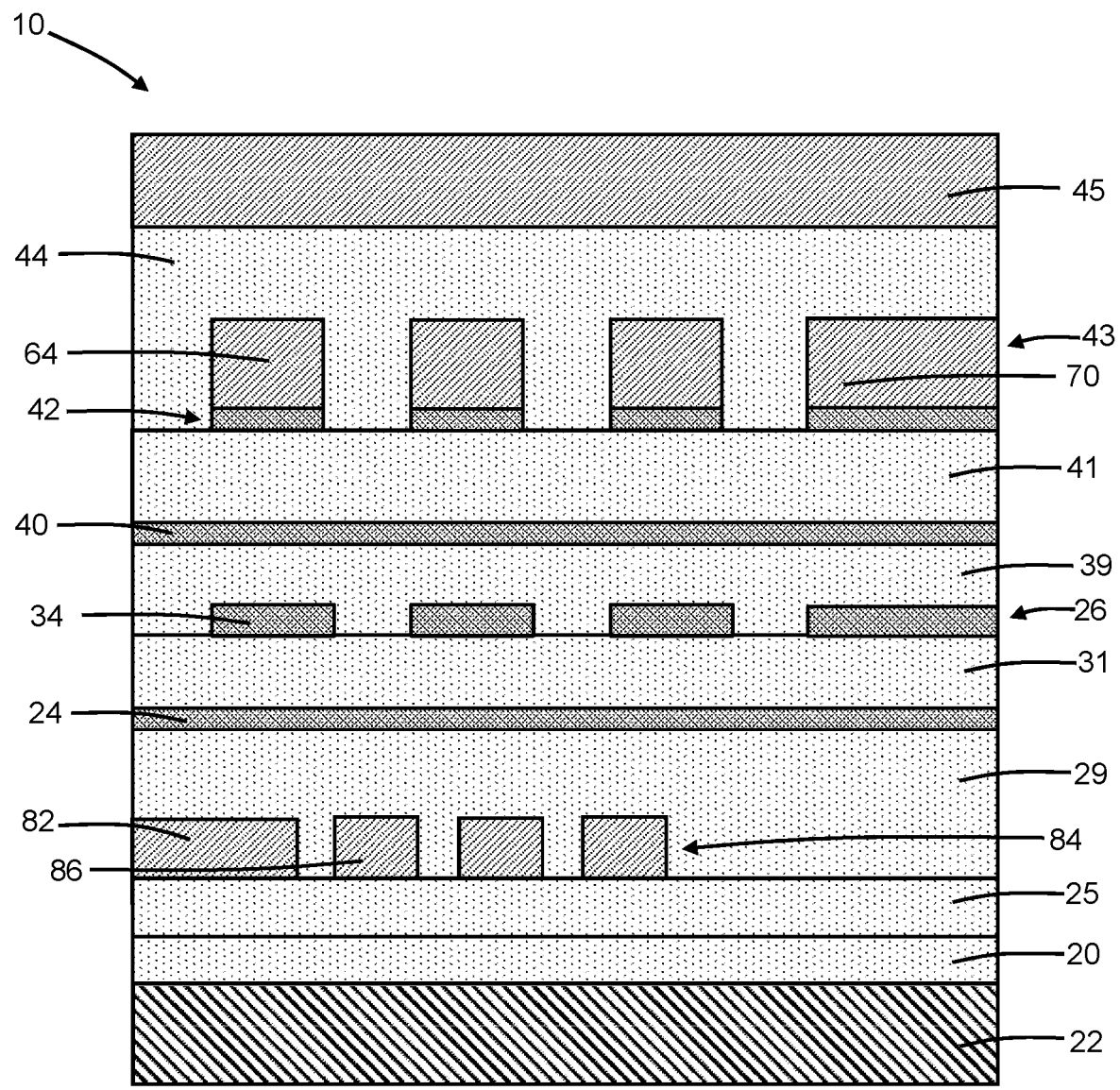
FIG. 10 is a cross-sectional view of a structure in accordance with alternative embodiments of the invention.

With reference to FIG. 10 and in accordance with alternative embodiments of the invention, the structure 10 may include a waveguide core 82 and a grating coupler 84 that replace the waveguide core 12, and both of the grating couplers 32, 72. Optical signals from the grating coupler 84 to both of the grating couplers 32, 72 and distributed to the waveguide cores 28, 68 within multiple levels in the back-end-of-line stack 48. The grating coupler 84 may include tapered segments 86 similar to tapered segments 34 and grooves similar to grooves 36 between adjacent tapered segments 86. In an embodiment, the tapered segments 64 of the grating coupler 72 may be centered over the tapered segments 34 of the grating coupler 32.

The waveguide core 82 and grating coupler 84 may be formed by depositing a layer of a material (e.g., silicon nitride) on the dielectric layer 25 and patterning the deposited layer by lithography and etching processes during middle-of-line processing. In an alternative embodiment, the waveguide core 82 and grating coupler 84 may be comprised of a different material, such as single-crystal silicon, that is formed by processing similar to that described in connection with the formation of the waveguide core 12.

Figure 11:
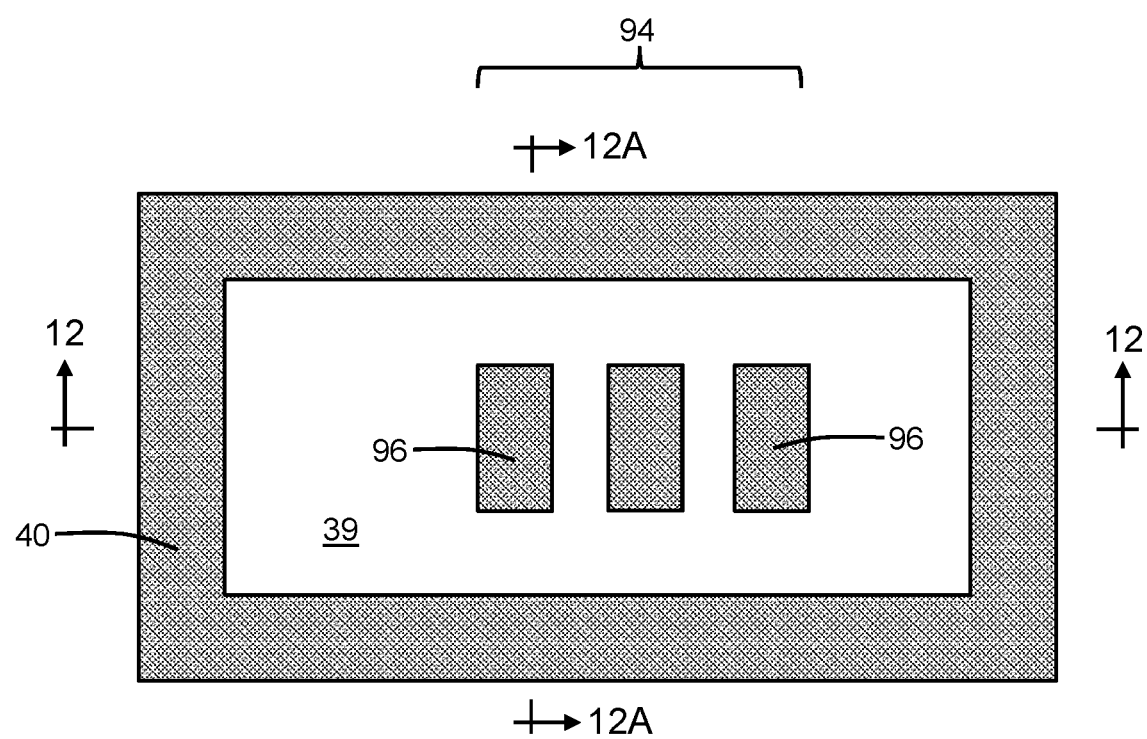
FIG. 11 is a top view of a structure in accordance with alternative embodiments of the invention.
Figure 12:
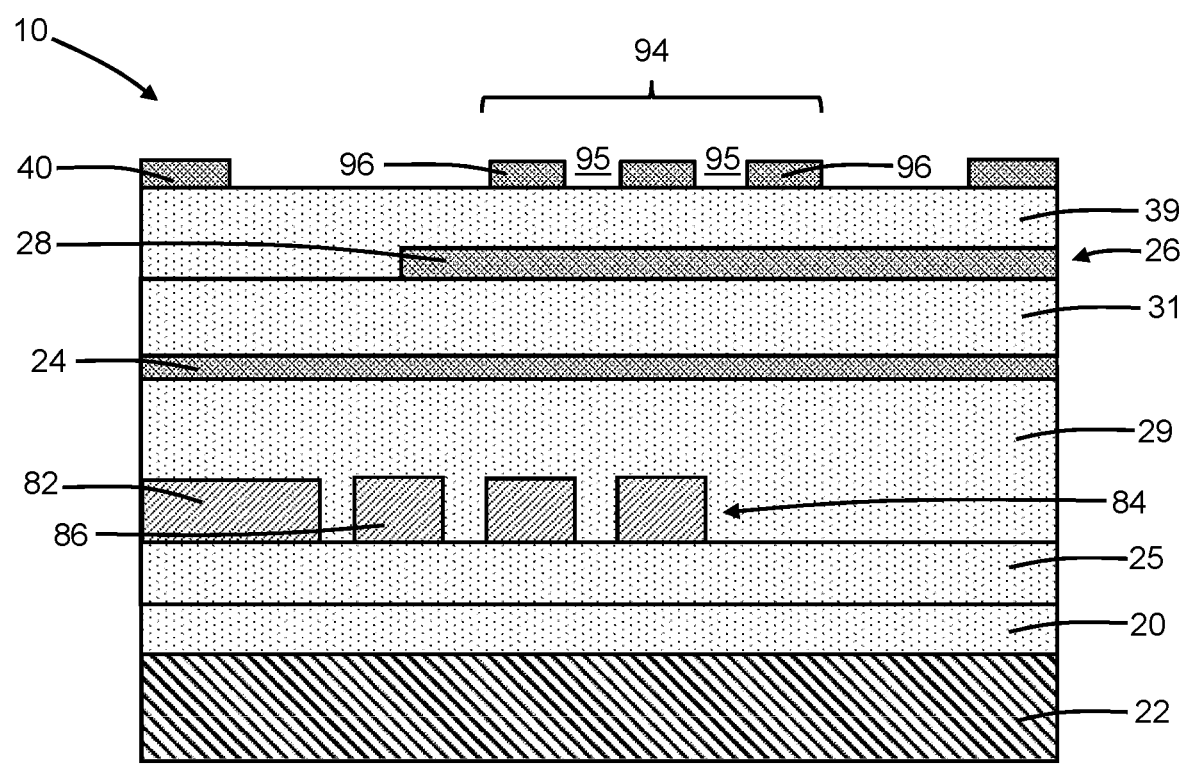
FIG. 12 is a cross-sectional view of the structure taken generally along line 12-12 in FIG. 11.
Figure 12A:
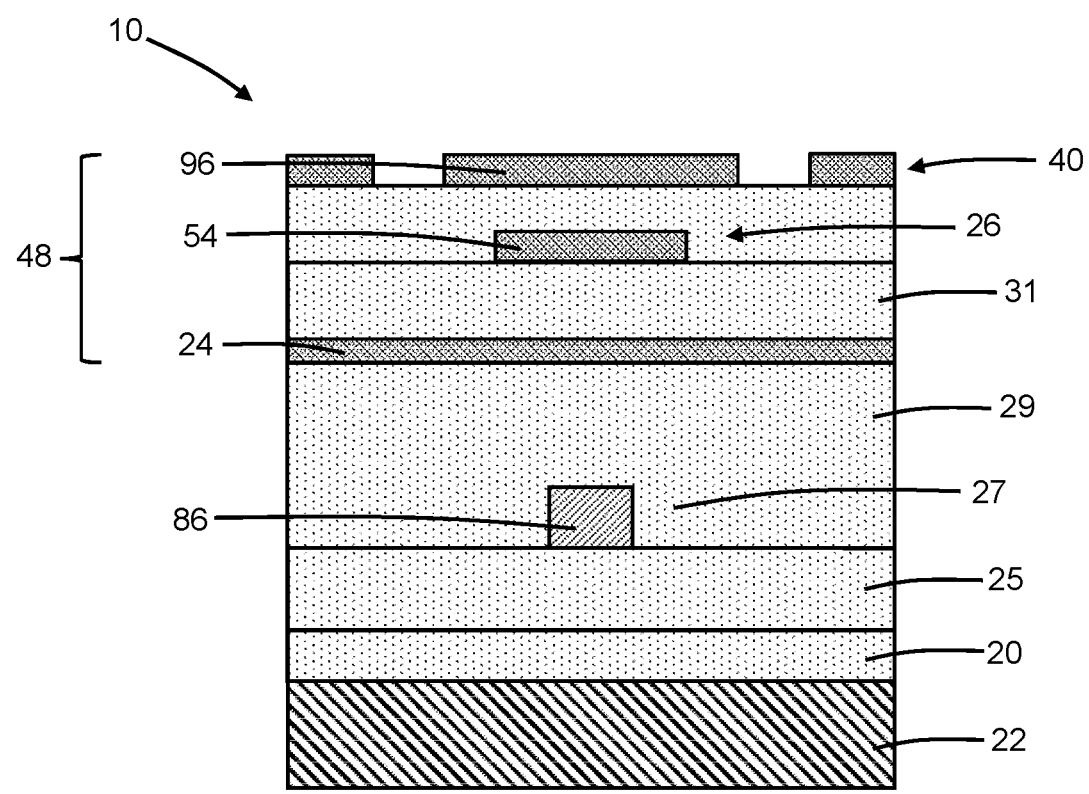
FIG. 12A is a cross-sectional view of the structure taken generally along line 12A-12A in FIG. 11.

With reference to FIGS. 11, 12, 12A and in accordance with alternative embodiments of the invention, the structure 10 may include a grating coupler 94 that is positioned over the tapered section 54. The grating coupler 94 includes segments 96 and grooves 95 that are positioned between adjacent segments 96. In an embodiment, the segments 96 of the grating coupler 94 may be wider than the tapered section 54 where overlapped. The grating coupler 94 may be formed by patterning the dielectric layer 40 by lithography and etching processes. The grating coupler 94 may function as a reflector to reflect optical signals that are not captured by the tapered section 54 of the waveguide core 28 downwardly toward the tapered section 54, which may provide for improved light confinement and reduced light leakage.

Processing of the structure 10 continues as described in connection with FIG. 5 to form dielectric layers 41, 42 43, 44, 45.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a substrate;
   a dielectric layer on the substrate;
   a first waveguide core including a tapered section, the first waveguide core positioned in a first level over the dielectric layer;
   a second waveguide core positioned in a second level over the dielectric layer, the second level differing in elevation above the dielectric layer from the first level; and
   a first grating coupler including a plurality of segments positioned in the second level adjacent to the second waveguide core,
   wherein the segments of the first grating coupler and the tapered section of the first waveguide core are positioned in a first overlapping arrangement.

2. The structure of claim 1 wherein the second waveguide core and the segments of the first grating coupler comprise nitrogen-doped silicon carbide or nitrogen-doped hydrogenated silicon carbide.

3. The structure of claim 2 further comprising:
   a back-end-of-line stack over the dielectric layer,
   wherein the back-end-of-line stack includes the second waveguide core and the first grating coupler, and the segments of the first grating coupler are positioned over the tapered section of the first waveguide core.

4. The structure of claim 3 wherein each segment of the first grating coupler includes a first layer comprised of nitrogen-doped silicon carbide or nitrogen-doped hydrogenated silicon carbide and a second layer comprised of silicon nitride.

5. The structure of claim 3 wherein the segments of the first grating coupler are centered over the tapered section of the first waveguide core.

6. The structure of claim 2 wherein the tapered section is tapered in a first direction, and the segments of the first grating coupler are inversely tapered in a second direction opposite to the first direction.

7. The structure of claim 1 wherein the first waveguide core comprises nitrogen-doped silicon carbide or nitrogen-doped hydrogenated silicon carbide.

8. The structure of claim 7 further comprising:
   a back-end-of-line stack over the dielectric layer,
   wherein the back-end-of-line stack includes the first waveguide core, and the tapered section of the first waveguide core is positioned over the segments of the first grating coupler.

9. The structure of claim 8 wherein the back-end-of-line stack includes a second grating coupler having a plurality of segments comprised of nitrogen-doped silicon carbide or nitrogen-doped hydrogenated silicon carbide, the second grating coupler is positioned in a third level over the dielectric layer, the third level differs in elevation above the dielectric layer from the first level and the second level, and the segments of the second grating coupler are positioned over the tapered section of the first waveguide core in a second overlapping arrangement.

10. The structure of claim 9 wherein the tapered section of the first waveguide core is positioned in a vertical direction between the segments of the first grating coupler and the segments of the second grating coupler.

11. The structure of claim 7 wherein the tapered section of the first waveguide core is centered over the segments of the first grating coupler.

12. A structure comprising:
    a substrate;
    a dielectric layer on the substrate;
    a first waveguide core positioned in a first level over the dielectric layer;
    a first grating coupler positioned in the first level adjacent to the first waveguide core;
    a second waveguide core positioned in a second level over the dielectric layer; and
    a second grating coupler including a plurality of segments positioned in the second level adjacent to the second waveguide core,
    wherein the segments of the second grating coupler and the segments of the first grating coupler are positioned in an overlapping arrangement.

13. The structure of claim 12 wherein the first grating coupler, the first waveguide core, the second waveguide core, and the second grating coupler comprise nitrogen-doped silicon carbide or nitrogen-doped hydrogenated silicon carbide.

14. The structure of claim 13 further comprising:
    a back-end-of-line stack over the dielectric layer,
    wherein the back-end-of-line stack includes the first waveguide core, the first grating coupler, the second waveguide core, and the second grating coupler, and the segments of the second grating coupler are positioned over the segments of the first grating coupler.

15. The structure of claim 14 wherein each segment of the second grating coupler includes a first layer comprised of nitrogen-doped silicon carbide or nitrogen-doped hydrogenated silicon carbide and a second layer comprised of silicon nitride.

16. A method comprising:
    forming a first waveguide core positioned within a first level over a dielectric layer on a substrate, wherein the first waveguide core includes a tapered section; and
    forming a second waveguide core and a grating coupler adjacent to the second waveguide core, wherein the second waveguide core and the grating coupler are positioned in a second level over the dielectric layer, the second level differs in elevation above the dielectric layer from the first level, and the grating coupler includes a plurality of segments positioned in an overlapping arrangement with the tapered section of the first waveguide core.

17. The method of claim 16 wherein the second waveguide core and the segments of the grating coupler comprise nitrogen-doped silicon carbide or nitrogen-doped hydrogenated silicon carbide.

18. The method of claim 17 further comprising:
    forming a back-end-of-line stack over the dielectric layer,
    wherein the back-end-of-line stack includes the second waveguide core and the grating coupler, and the segments of the grating coupler are positioned over the tapered section of the first waveguide core.

19. The method of claim 16 wherein the first waveguide core comprises nitrogen-doped silicon carbide or nitrogen-doped hydrogenated silicon carbide.

20. The method of claim 19 further comprising:
    forming a back-end-of-line stack over the dielectric layer,
    wherein the back-end-of-line stack includes the first waveguide core, and the tapered section of the first waveguide core is positioned over the segments of the grating coupler.

* * * * *